United States Patent Office

2,784,187
PROCESS FOR THE PRODUCTION OF MONOPHENYLMELAMINE

Bert S. Gorton and Byron L. Williams, Jr., Texas City, Tex., assignors to Monsanto Chemical Company, St. Louis, Mo., a corporation of Delaware No Drawing. Application December 30, 1954, Serial No. 478,877

6 Claims. (Cl. 260—249.6)

This invention relates to monophenylmelamine and more particularly to an improved process for its production.

Monophenylmelamine is used as an intermediate and as a modifier for various types of synthetic resins. Heretofore it has been prepared by the reaction of cyanuric chloride and ammonia to form 2,4-diamino-6-chloro-s-triazine which was then reacted with aniline to form monophenylmelamine hydrochloride, from which monophenylmelamine could be obtained by neutralization. The prior art has always indicated that in order to obtain monophenylmelamine of the desired degree of purity, isolation and purification of the 2,4-diamino-6-chloro-s-triazine was a requisite. This is a time-consuming and costly step and it is an object of this invention to provide an improvement in this process for the production of monophenylmelamine. Other objects will become apparent from a description of the process.

It has now been discovered that under certain conditions cyanuric chloride and ammonia can be reacted in a totally aqueous medium, that is, a reaction medium consisting of water, in the presence of a wetting agent to form a reaction mixture containing 2,4-diamino-6-chloro-s-triazine, and the 2,4-diamino-6-chloro-s-triazine in the reaction mixture thus obtained, without isolation and purification, can be reacted with aniline to form monophenylmelamine hydrochloride and substantially pure monophenylmelamine recovered therefrom by neutralization. The following example illustrates the novel process of this invention and all parts are by weight unless otherwise specified:

A solution of 1150 parts of water and 60.1 parts of ammonia was prepared and placed in a suitable container. One part of the condensation product of 1 part of tall oil and about 2.0 parts of ethylene oxide was added. With constant agitation 130.5 parts of cyanuric chloride were added at a rate such that the temperature did not exceed 50° C. The mixture was then heated, with agitation, for a period of about 4 hours while maintaining the temperature between 45°-50° C. Excess ammonia was then neutralized with concentrated hydrochloric acid.

To this reaction mixture containing 2,4-diamino-6-chloro-s-triazine was then added 600 parts of water and 65.8 parts of aniline. The mixture was heated with agitation to 90-95° C. until a solution began to form and the mixture was then refluxed for about 4 hours. The reaction mixture was then filtered at a temperature of about 85°-90° C. The filtrate is a solution of crude monophenylmelamine hydrochloride.

The filtrate was then cooled to room temperature (about 25°-30° C.). Sodium hydroxide, in the form of a 5% aqueous solution, was slowly added, while maintaining the temperature below 30° C., until the pH of the mixture was greater than 8.5. Approximately 28.3 parts of sodium hydroxide were required.

The precipitated monophenylmelamine was separated by centrifuging, washed with water and dried at 105° C. The material was a white crystalline product having a melting point of 203°-205° C. Yield was approximately 70% based on cyanuric chloride.

The quantities of reactants and reaction conditions set forth in the preceding example can be varied without departing from the scope of this invention. It is preferred that in the first step of the process at least 4 mols of ammonia be used for each mol of cyanuric chloride, and exceptionally good results are obtained when the reaction is initiated with approximately 5 mols of ammonia per each mol of cyanuric chloride. A greater excess of ammonia can be used if desired, but this tends to promote tri-substitution.

The temperature of the reaction between cyanuric chloride and ammonia should be maintained below about 50° C. and preferably in the range of from about 40° to about 50° C. Higher temperatures promote tri-substitution, whereas at lower temperatures mono-substitution is favored.

The quantity of water making up the reaction medium can be varied substantially and is governed primarily by the desired ease of handling.

Any wetting agent can be used in this step of the process. These include soaps, the alkyl aryl sulfonates, of which sodium dodecylbenzenesulfonate is a particular example, sulfated fatty alcohols, alkyl sulfonates, sulfated esters and acids, amide sulfates and sulfonates, sulfated and sulfonated oils, fats, and waxes, fatty esters of glycerol and glycol and other polyhydric products of ethylene oxide with fatty acids, abietic acid, alkyl phenols, such as nonyl phenol and mercaptans, such as tert.-dodecyl mercaptan, etc., as well as mixtures of these and/or other surface-active agents.

Only minor amounts of the wetting agent are required and quantities in the range from about 0.01% by weight to about 1.0% by weight of total composition are particularly applicable. Higher or lower concentrations can be used if desired.

As previously stated, the 2,4-diamino-6-chloro-s-triazine is not isolated from the reaction mixture and aniline is reacted with the 2,4-diamino-6-chloro-s-triazine in the reaction mixture obtained in the first step of the process. It is preferred that approximately 1 mol of aniline be used for each mol of cyanuric chloride used in the first step of the process. An excess of aniline can be used if desired, but offers no particular advantage. This step of the reaction is preferably carried out at elevated temperatures. Best results are obtained by boiling the reaction mixture under reflux conditions. Some purification of the reaction mixture can then be attained by filtration, preferably at elevated temperatures.

Neutralization and precipitation of the monophenylmelamine from the solution of its hydrochloride obtained in the preceding step can be accomplished by using any of the alkali metal hydroxides. The alkali metal hydroxide should be added in an amount sufficient to raise the pH of the reaction mixture to at least 8.5. The temperature of the reaction can be varied if desired, but best results are obtained at temperatures below about 30° C.

The precipitated monophenylmelamine can be recovered by any convenient method. It is preferably recovered by filtration or centrifugation and then washed and dried.

What is claimed is:

1. In the process for the production of monophenylmelamine by the reaction of cyanuric chloride and ammonia to form 2,4-diamino-6-chloro-s-triazine which is then reacted with aniline to form monophenylmelamine hydrochloride from which monophenylmelamine is obtained by neutralization with an alkali metal hydroxide, the improvement which comprises reacting aniline with the reaction mixture obtained by reacting cyanuric chloride and ammonia in a reaction medium consisting of water and in the presence of a wetting agent selected from the group consisting of alkyl aryl sulfonates and condensation products of ethylene oxide with abietic acid, tall oil, alkyl phenols and alkyl mercaptans.

2. In the process for the production of monophenylmelamine by the reaction of cyanuric chloride and ammonia to form 2,4-diamino-6-chloro-s-triazine which is then reacted with aniline to form monophenylmelamine hydrochloride from which monophenylmelamine is obtained by neutralization with an alkali metal hydroxide, the improvement which comprises reacting aniline with the reaction mixture obtained by reacting cyanuric chloride and ammonia in a reaction medium consisting of water at a temperature below about 50° C. and in the presence of a wetting agent selected from the group consisting of alkyl aryl sulfonates and condensation products of ethylene oxide with abietic acid, tall oil, alkyl phenols and alkyl mercaptans.

3. In the process for the production of monophenylmelamine by the reaction of cyanuric chloride and ammonia to form 2,4-diamino-6-chloro-s-triazine which is then reacted with aniline to form monophenylmelamine hydrochloride from which monophenylmelamine is obtained by neutralization with an alkali metal hydroxide, the improvement which comprises reacting aniline with the reaction mixture obtained by reacting cyanuric chloride and ammonia in a reaction medium consisting of water at a temperature in the range of from about 40° C. to about 50° C. and in the presence of a wetting agent selected from the group consisting of alkyl aryl sulfonates and condensation products of ethylene oxide with abietic acid, tall oil, alkyl phenols and alkyl mercaptans.

4. In the process for the production of monophenylmelamine by the reaction of cyanuric chloride and ammonia to form 2,4-diamino-6-chloro-s-triazine which is then reacted with aniline to form monophenylmelamine hydrochloride from which monophenylmelamine is obtained by neutralization with an alkali metal hydroxide, the improvement which comprises reacting approximately 1 molecular proportion of aniline with the reaction mixture obtained by reacting 1 molecular proportion of cyanuric chloride with at least 4 molecular proportions of ammonia in a reaction medium consisting of water at a temperature in the range of from about 40° C. to about 50° C. and in the presence of a wetting agent selected from the group consisting of alkyl aryl sulfonates and condensation products of ethylene oxide with abietic acid, tall oil, alkyl phenols and alkyl mercaptans.

5. In the process for the production of monophenylmelamine by the reaction of cyanuric chloride and ammonia to form 2,4-diamino-6-chloro-s-triazine which is then reacted with aniline to form monophenylmelamine hydrochloride from which monophenylmelamine is obtained by neutralization with an alkali metal hydroxide, the improvement which comprises reacting 1 molecular proportion of aniline at an elevated temperature with the reaction mixture obtained by reacting 1 molecular proportion of cyanuric chloride with at least 4 molecular proportions of ammonia in a reaction medium consisting of water at a temperature in the range of from about 40° C. to about 50° C. and in the presence of a wetting agent selected from the group consisting of alkyl aryl sulfonates and condensation products of ethylene oxide with abietic acid, tall oil, alkyl phenols and alkyl mercaptans.

6. In the process for the production of monophenylmelamine by the reaction of cyanuric chloride and ammonia to form 2,4-diamino-6-chloro-s-triazine which is then reacted with aniline to form monophenylmelamine hydrochloride from which monophenylmelamine is obtained by neutralization with an alkali metal hydroxide, the improvement which comprises boiling under reflux conditions approximately 1 molecular proportion of aniline with the reaction mixture obtained by reacting 1 molecular proportion of cyanuric chloride with at least 4 molecular proportions of ammonia in a reaction medium consisting of water at a temperature in the range of from about 40° C. to about 50° C. and in the presence of a wetting agent selected from the group consisting of alkyl aryl sulfonates and condensation products of ethylene oxide with abietic acid, tall oil, alkyl phenols and alkyl mercaptans.

References Cited in the file of this patent

Beilstein, vol. 26, 4th ed., pp. 225 and 247.